United States Patent [19]

Kiesz

[11] 4,302,023
[45] Nov. 24, 1981

[54] DOLLY WITH VERTICALLY ADJUSTABLE SHELF

[76] Inventor: Lloyd W. Kiesz, 71 Elm St., Woodland, Calif. 95695

[21] Appl. No.: 38,295

[22] Filed: May 11, 1979

[51] Int. Cl.$^3$ .............................................. B62D 61/12
[52] U.S. Cl. ................................ 280/43.24; 280/79.3; 182/17; 182/118; 108/106
[58] Field of Search .................. 280/79.2, 79.3, 43.24, 280/43.22, 5.2, DIG. 10; 182/17, 15, 63, 117, 118, 119; 211/151, 153, 208, 187; 108/12, 106, 107

[56] References Cited

U.S. PATENT DOCUMENTS

| | | | |
|---|---|---|---|
| 2,003,162 | 5/1935 | Ulmer | 280/35 |
| 2,258,819 | 10/1941 | Sohn | 280/35 |
| 2,304,622 | 12/1942 | Barrett | 280/43.15 X |
| 2,436,647 | 2/1948 | Huey | 280/43.24 X |
| 2,729,196 | 1/1956 | Breitenbach | 296/43 X |
| 2,941,617 | 6/1960 | Stiffler | 182/223 X |
| 3,054,623 | 9/1962 | Simpkins | 280/43.14 |
| 3,520,547 | 7/1970 | Anthony | 280/43.24 |
| 3,904,216 | 9/1975 | Metrailer | 280/43.24 X |
| 3,997,024 | 12/1976 | Fredricks | 182/17 |
| 4,034,716 | 7/1977 | Fleming | 414/537 X |

FOREIGN PATENT DOCUMENTS

| | | | |
|---|---|---|---|
| 2119218 | 11/1972 | Fed. Rep. of Germany | 182/118 |
| 2352949 | 4/1975 | Fed. Rep. of Germany | 182/223 |
| 394039 | 11/1965 | Switzerland | 280/43.24 |

Primary Examiner—Joseph F. Peters, Jr.
Assistant Examiner—D. W. Underwood
Attorney, Agent, or Firm—Harvey B. Jacobson

[57] ABSTRACT

A dolly is disclosed having a vertically adjustable shelf attachable to independent vertical side rails resting on a surface, the rails constituting legs for the support of the shelf, two of which are wheeled, the shelf having a pair of laterally and oppositely attached wheels which can be lifted with the shelf from the bottom to the top of the legs to render the device stationary and permit a weight to be supported on the shelf. When the shelf is lowered on the rails to its lowermost position, all four wheels contact the surface for movement of the dolly from one location to another. In either mode of use, a weight is supportable on the shelf. In another form of the dolly, a storable handle bar can be attached near the top of the legs to permit use as a hand truck when the device is in the mode of use which allows movement of a supported weight. With the first form, movement along a surface is contemplated, while in the second form, movement up and down stairways is also possible.

16 Claims, 13 Drawing Figures

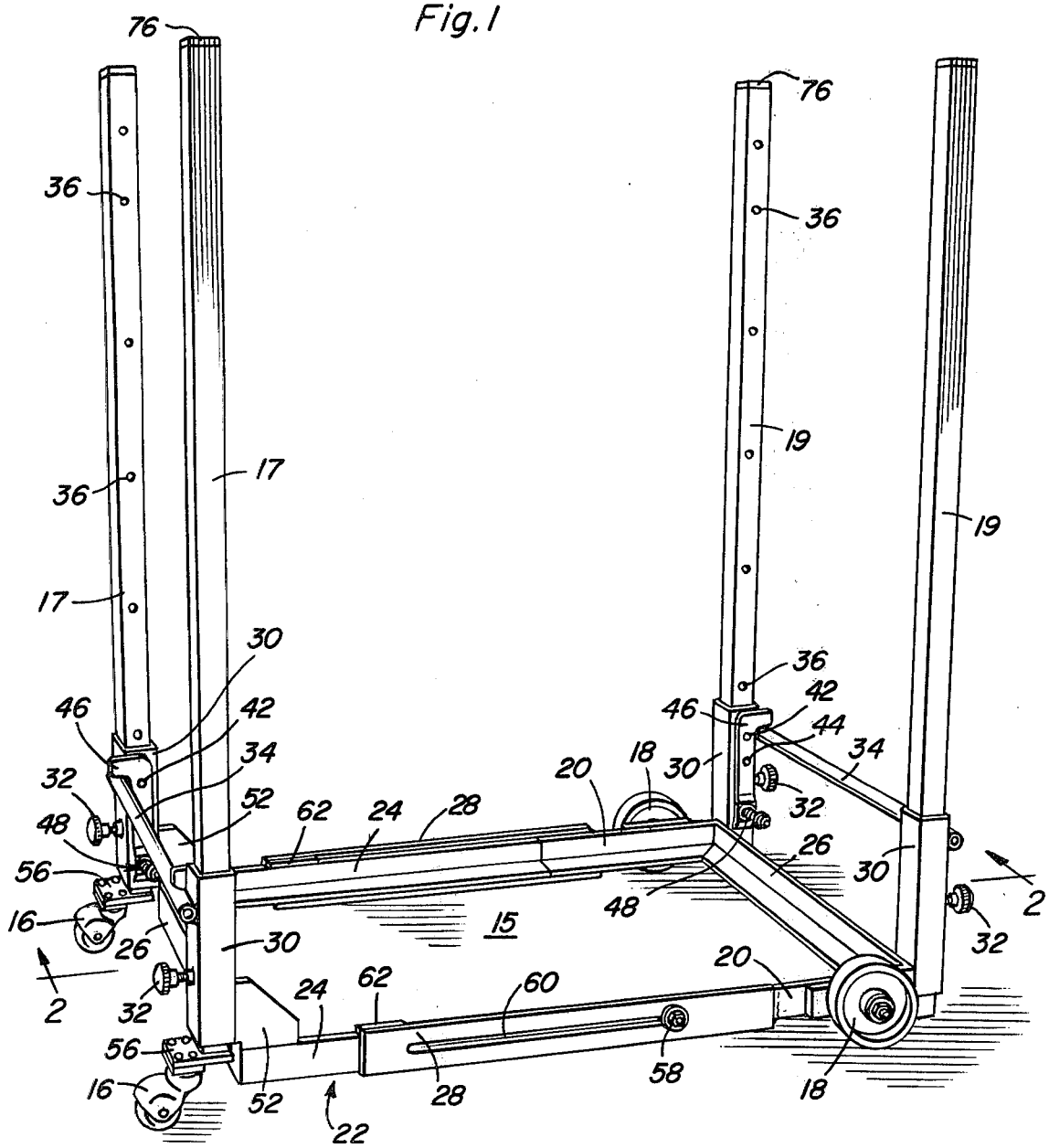
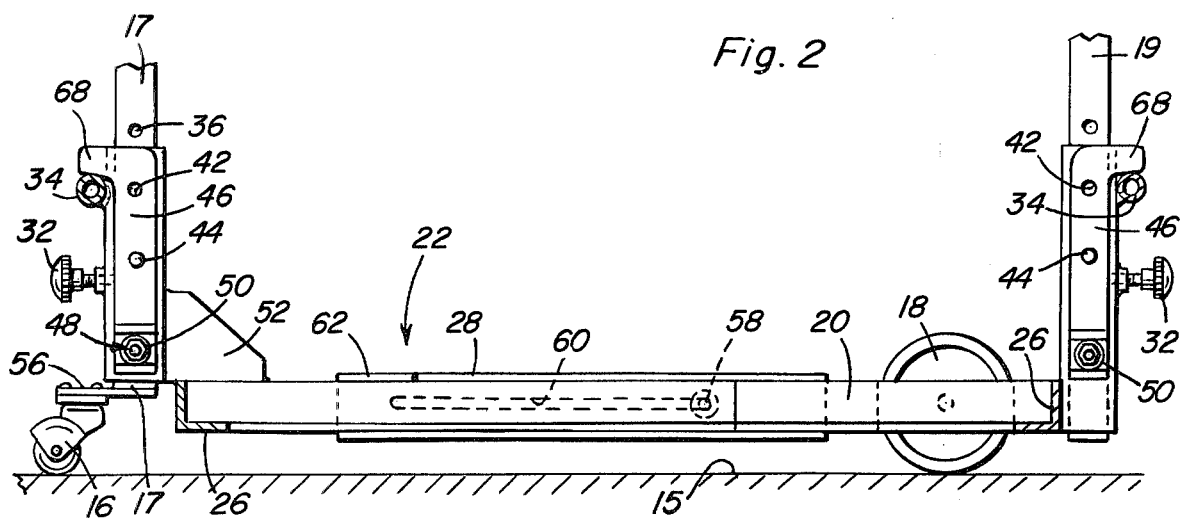

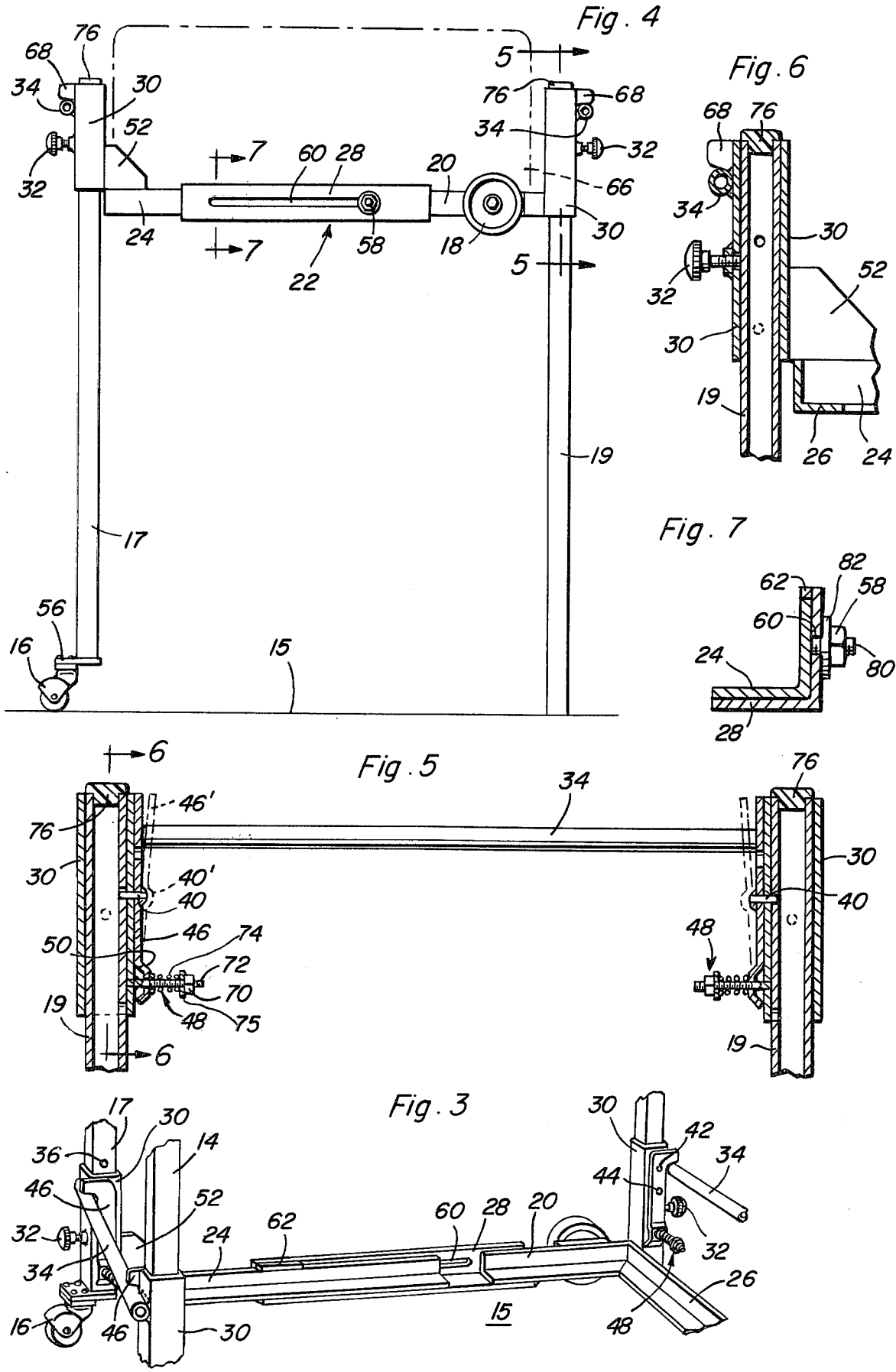

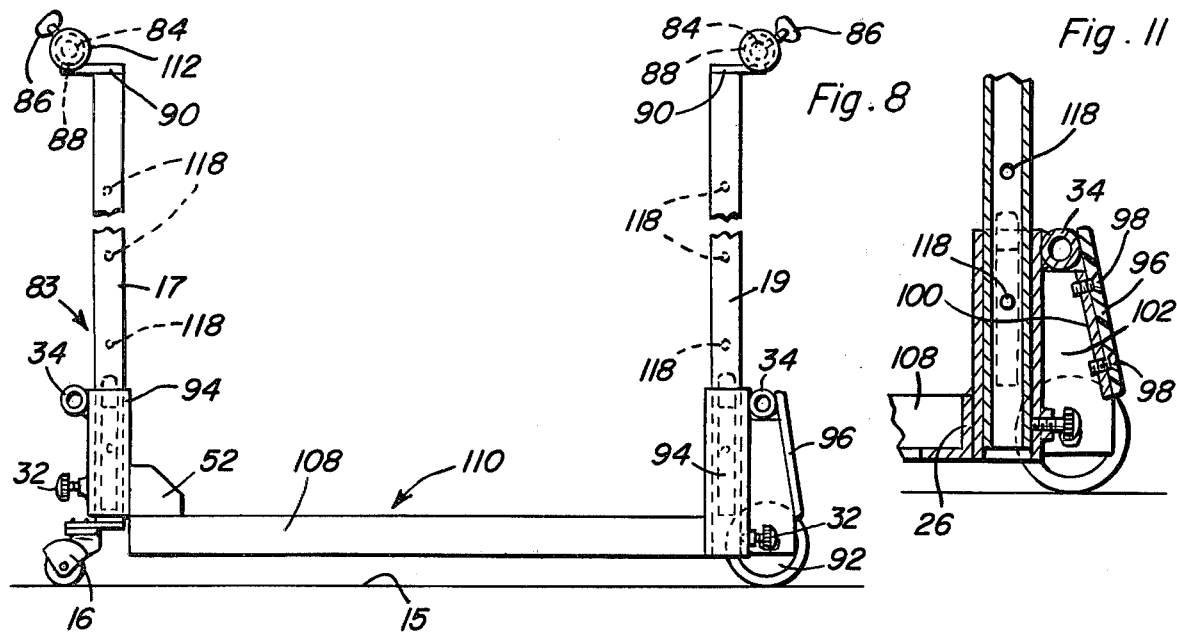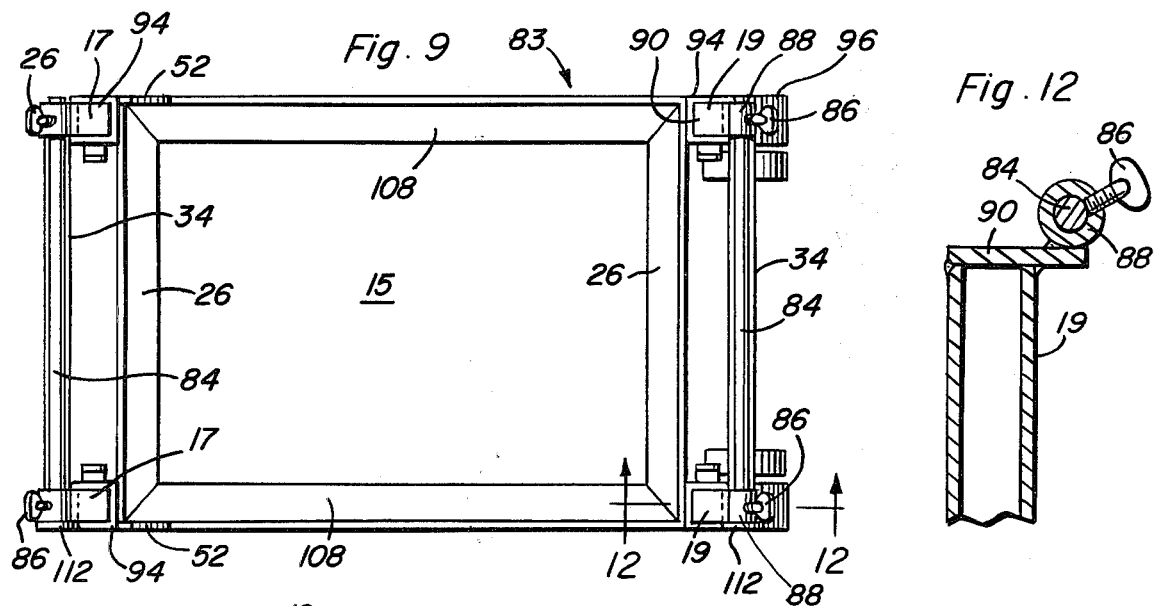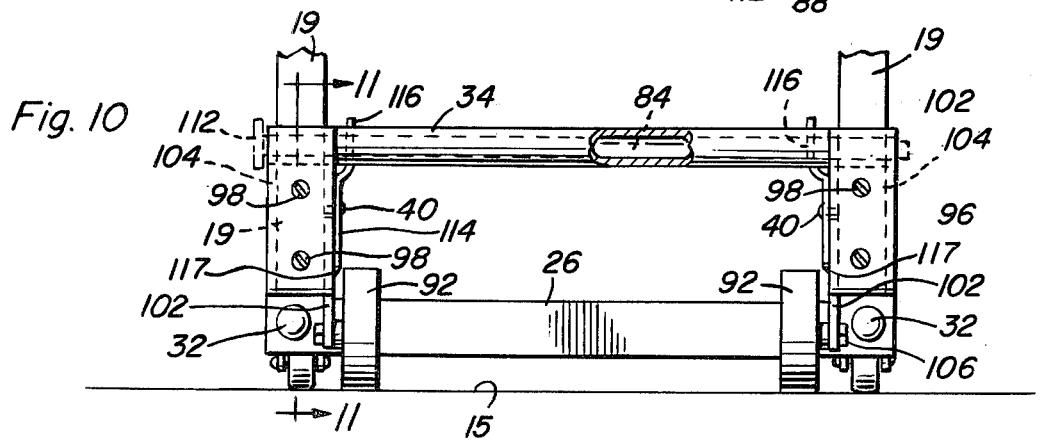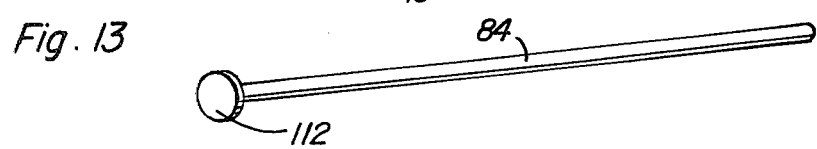

DOLLY WITH VERTICALLY ADJUSTABLE SHELF

BACKGROUND OF THE INVENTION

1. Field of the Invention

The invention relates to a wheeled device for transporting of articles. More particularly, the invention discloses a furniture dolly designed to transport and hold musical equipment, adjustable in length to accommodate varying sizes of equipment, and having a shelf which can be adjustably raised or lowered to suit requirements of the user.

2. Description of the Prior Art

U.S. Pat. No. 2,729,196, issued Jan. 3, 1956 to Breitenbach, discloses a portable rack having a pair of wheels seen in the right-hand side of FIG. 1 to be attached to side rails so as to be vertically adjustable with the rails. However, it does not appear from the Breitenbach disclosure that the side rails together with the wheels are intended to be lifted from the bottom to the top of the corner posts of the rack so as to permit a weight to be supported adjacent the bottom of the rack during movement from one location to another, and adjacent the top of the rack during use of the device as a shelf.

Other patents related to the subject matter of the present invention include the following: U.S. Pat. No. 2,003,162, May 28, 1935 U.S. Pat. No. 2,258,819, Oct. 14, 1941 U.S. Pat. No. 2,304,622, Dec. 8, 1942 U.S. Pat. No. 2,436,647, Feb. 24, 1948 U.S. Pat. No. 3,054,623, Sept. 18, 1962

SUMMARY OF THE INVENTION

The dolly of the present invention fills the need for a device which has the capability to transport and hold articles varying both in length and width, and to provide a platform of vertically adjustable height. In particular, a need for such a device exists in the musical entertainment field, where small musical groups require musical equipment of varying sizes to be moved frequently, and require a support platform which can be raised or lowered to support sound equipment, such as amplifiers, speakers and the like, at a level above the floor surface to suit sound requirements. The present invention fills the need for such a device by providing a framework of four vertical legs on which a vertically adjustable shelf is mounted. Two of the four legs are provided with permanently attached caster wheels, and a pair of wheels mounted on the vertically adjustable shelf provides mobility to the dolly when the shelf is placed in its lowermost position, where the wheels on the shelf are in close proximity to the pair of verticl side rails not provided with caster wheels. When the vertically adjustable shelf is raised, the dolly becomes stationary due to the lifting of the wheels mounted on the shelf, and the device can then be used for supporting an article at any desired height.

Accordingly, it is an object of the invention to provide a dolly for transporting articles of varying size, such as musical instruments and equipment.

Another object of the invention is to permit convenient conversion into a device for holding or storing articles, such as musical equipment.

Still another object of the invention is to provide for vertical adjustment of the height of support of such articles.

Yet another object of the invention is to permit side rails of the device to be adapted for lifting of an adjustable shelf having wheels so as to permit a weight to be supported adjacent the bottom of the rack during movement from one place to another, and adjacent the top of the rack during use of the device as a stationary shelf.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the dolly of the present invention with the shelf positioned for transporting of an article wherein all wheels contact the supporting surface and the side rails are usable as guiding handles.

FIG. 2 is a fragmentary longitudinal sectional view of the lower portion of the dolly taken substantially upon a plane passing along section line 2—2 in FIG. 1.

FIG. 3 is a fragmentary perspective view of the lower portion of the device of FIG. 1, showing the shelf portion extended to a position which allows transport of an article of greater length than can be accommodated in the device of FIG. 1.

FIG. 4 is a side elevational view of the device of the present invention in the mode of use which permits storing of an object after raising of the shelf element. The object held by the shelf is shown in phantom in FIG. 4.

FIG. 5 is an end sectional view of the handle assembly of the device in the configuration shown in FIG. 4, taken substantially upon a plane passing along section line 5—5 on FIG. 4.

FIG. 6 is an enlarged fragmentary sectional view of the upper clamp means for attaching the shelf to the vertical rails.

FIG. 7 is an enlarged sectional view taken substantially upon a plane passing along section line 7—7 on FIG. 4, showing the bracket means which permits longitudinal extension of the shelf.

FIG. 8 is a side elevational view of a second embodiment of the invention in the mode of use where transporting of an article is to be undertaken, this second embodiment permitting operation as a hand truck over stairways.

FIG. 9 is a top plan view of the device of FIG. 8.

FIG. 10 is an enlarged fragmentary end elevational view of the second embodiment, with the handle shown in phantom in its stored location.

FIG. 11 is an enlarged fragmentary sectional view of the wheeled portion, taken substantially upon a plane passing along section line 11—11 on FIG. 10.

FIG. 12 is an enlarged fragmentary, sectional view of the handle portion of the device of FIG. 8, taken substantially upon a plane passing along section line 12—12 on FIG. 9.

FIG. 13 is a perspective view of the insertable handle of the second embodiment of the invention.

DESCRIPTION OF THE PREFERRED EMBODIMENT

When used in the transport mode, the shelf of the present invention is mounted near the base of four upright vertical posts in a manner which permits the use of all wheels of the device during movement along a surface 15 from one location to another. Specifically, in FIG. 1 caster wheels 16 are attached near the base of vertical upright posts 17 and can swivel through 360 degrees allowing transverse movement of posts 17, as well as longitudinal movement. While wheels 18 are located near the base of upright posts 19, and are in contact with surface 15 to permit longitudinal movement, wheels 18 are attached to frame members 20 of shelf 22. Frame members 20 can be extended longitudinally from frame members 24 to adapt shelf 22 to carrying of larger articles, and extension in this manner, illustrated in FIG. 3, is facilitated by slotted retainer brackets 28. Frame members 24 and 20 transverse frame member 26 are held on posts 17 and 19 by sleeves 30, each of which can be clamped to its respective post by knob 32. Support rod 34 permits raising and lowering of each pair of sleeves 30 on loosening of the appropriate knobs 32. Holes 36 in upright posts 17 and 19 are spaced to permit insertion of pin 40 into hole 36, and thereby retain the entire assembly at a desired uniform height. Pin 40 can be inserted through either of holes 42 or 44 in bar 46, chosen to select the height of shelf 22. Bar 46 is retained on sleeve 30 by spring biased threaded rod assembly 48, passing through boss 50 of bar 46. Sleeves 30 on posts 17 are connected to frame members 24 by gussets 52, each of which preferably is welded to each element along its contact line. Platform 56 supports caster wheel 16, and is attached by welding or otherwise to the appropriate upright post 17. Adjusting nut 58 controls the longitudinal extension of frame members 20 from frame members 24 in the manner illustrated in FIGS. 3 and 7. Adjusting nut 58 slides in slot 60 of bracket 28, which is provided with overhanging means in the form of tab 62 to prevent disconnection of bracket 28 from frame members 24.

Turning now to FIG. 4, the device is seen to be capable of supporting on shelf 22 an object 66 (shown in phantom) a substantial distance above surface 15. In such a configuration, posts 19 rest directly upon surface 15, with wheels 18 no longer in contact with surface 15, and the entire device is rendered stationary in position due to the anchoring effect of posts 19. The structural details of the mounting means for attaching shelf 22 to the vertical support rails are shown in FIG. 5 where movement of bar 46 is represented by dotted lines showing its positioning inwardly by manual pressure on the upper extension 68 of bar 46. In the position 46', the pin 40 is dislodged outwardly to the position 40' thereby enabling upward or downward adjustment of the mounting means by lifting or lowering of rod 34. The ease of flexing of bar 46 can be adjusted by tightening of nut 70 on threaded rod 72. Spring 74 is compressed by washer 75 onto boss 50. Nut 70, rod 72, spring 74 and washer 75 form the assembly designated by the numeral 48. Posts 17 and 19 are conveniently provided with plugs 76. In FIG. 7, adjusting nut 58 permits sliding of threaded pin 80 in slot 60, and can be tightened on washer 82 to permit frame member 24 to be drawn outwardly and away from frame member 20 to which threaded pin 80 is attached by welding or other suitable equivalent means.

In the second form of the invention, shown in FIGS. 8-13, a dolly 83 is shown provided with a storable handle 84, storable in support rod 34, which has a hollow central passage of sufficient diameter to permit insertion of handle 84, the configuration of which is best seen in FIG. 13, and the position of which can be seen in the transport mode in FIG. 8, handle 84 being held by thumbscrews 86 in collars 88, which are welded or otherwise attached to posts 17 and 19 through support platform 90. It is readily apparent from FIG. 8 that, with wheels 92 positioned behind sleeves 94, it is possible to allow wheels 92 to rest upon a stairway, and by exerting a guiding and controlling action on handle 84 above post 19, a single operator can transport the dolly 83 up a staircase by appropriate pulling action, and can lower the device down a staircase by a releasing action. Protective plate 96 is provided to allow slipping over the step edges or runners covering the steps of a staircase, thereby protecting the staircase surface and avoiding snagging of the dolly during stairway maneuvering. As is best seen in FIG. 11, plate 96 is attached by screws 98 to support base 100, which is supported by gussets 102 and 104. Gusset 102 also supports wheel 92, through bolt mount 106.

Longitudinal member 108 is shown in the second embodiment of the invention without adjusting means for extending posts 17 and 19 longitudinally with respect to each other, although the frame members can be provided with extension means such as that illustrated in FIG. 3 for the first embodiment of the invention, in order to adapt the shelf to carrying of larger articles. Longitudinal frame members 108 and transverse frame members 26 form shelf 110, with gusset 52 serving to attach longitudinal frame member 108 to its corresponding sleeve 94. Knobs 32 perform the same function in lifting of shelf 110 as in the first embodiment of the invention, as described above. Cap 112 on handle 84 is provided to limit movement thereof in the stored position within support rod 34.

In a further variation of the second embodiment, namely dolly 83 of FIG. 8, from the first embodiment of the invention, namely, the dolly of FIG. 1, bar 114, which performs the same function as bar 46 of the first embodiment, is provided with extension 116 disposed transversely inwardly, rather than a backwardly projecting ear, as with bar 46. Moreover, bar 114 is welded to sleeve 94 at weld 117, allowing inward flexing upon manual gripping of extensions 116. Pin 40 can then be inserted in one of holes 118 as sleeve 94 is lifted or lowered on post 17 or 19 to the desired level.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for support of an article during transport or storage on a surface at an adjustable height above the surface comprising a plurality of rail means, a substantially horizontal shelf means slidable vertically on said rail means for support of the article, the shelf means including clamp means for adjustment of the height of the article in storage thereof, the shelf means further including shelf wheel means for engaging the surface for transport of the article when the shelf is clamped by said clamp means to a lowermost position on said rail means, said rail means comprising two pair of vertical rails, each of the first pair of which includes a rail wheel means contacting the surface, each of the second pair of which is in close proximity to said shelf wheel means when said shelf means is in said lowermost position so as to permit lifting of the second pair of rails from said surface, each of said rails of at least one of said pair being independently movable with respect to said shelf means in the vertical direction.

2. The device of claim 1 wherein said rail wheel means comprises a caster wheel swivelable throughout a full circle and mounted on a platform offset in a direction remote from said shelf means to avoid interference between the caster wheel and the shelf means.

3. The device of claim 2 wherein said shelf means comprises a rectangular framework attached at its corners to sleeves slidingly fastenable to the vertical rails by said clamp means.

4. The device of clamp 3 wherein said clamp means comprises a threaded pin turnable by a knob into a compatibly threaded recess in each sleeve for frictional clamping engagement of the sleeve on each corresponding vertical rail.

5. The device of claim 4 wherein said framework is adjustably extendable longitudinally to permit adjustment of the framework length to the length of said article.

6. The device of claim 5 wherein said adjustably extendable framework includes longitudinally collinear frame members and a slotted extension bracket connecting the frame members, the bracket having a slot through which a pin passes for tightenably securing the bracket to the frame members.

7. The device of claim 5 wherein said shelf wheel means comprises a pair of wheels fixedly mounted on opposite frame members.

8. The device of claim 7 wherein the sleeves on the first pair of vertical rails are connected by a handle arm, and the sleeves on the second pair of vertical rails are connected by a second handle arm to facilitate vertical adjustment of the height of the shelf means.

9. The device of claim 8 wherein said vertical rails are square and tubular, the inside transverse faces of which are provided with a plurality of mounting holes located in groups at a uniform height above said surface, the device further including a plurality of guide pins, said sleeves having inside transverse faces which are provided with through holes for alignment by placing one of said through holes and one of said mounting holes in register and insertion of one of the guide pins therethrough.

10. The device of claim 9 wherein said shelf means further includes a guide bar holding said guide pin and mounted on the inside transverse face of each sleeve by a spring biased fastener and for manual flection of the guide bar to facilitate said vertical adjustment of the height of the shelf means.

11. The device of claim 4 wherein the sleeves on the first pair of vertical rails are connected by a handle arm, the sleeves on the second pair of vertical rails are connected by a second handle arm, the device further including a handle and a pair of collars aligned and mounted upon the upper portion of said first pair of vertical rails such that said handle is insertable through said collars for guidingly moving the device.

12. The device of claim 11 wherein said shelf wheel means comprises a pair of wheels fixedly mounted by mounting means on the sleeves slidingly fastenable on said second pair of rails, the wheels having an axis of rotation lying on the outward side of the plane of said second pair of rails.

13. The device of claim 11 further comprising a mounting gusset attached to each of the sleeves on the second pair of rails, and a protective plate supported by said mounting gusset, whereby said device can be transported upwardly or downwardly along a staircase.

14. The device of claim 13 wherein said vertical rails are square and tubular, the inside transverse faces of which are provided with a plurality of mounting holes located in groups at a uniform height above said surface, the device further including a plurality of guide pins, said sleeves having inside transverse faces which are provided with through holes for alignment by placing one of said through holes and one of said mounting holes in register and insertion of one of said guide pins therethrough.

15. The device of claim 14 wherein said shelf means further includes a guide bar holding said guide pin and mounted on the inside transverse face of each sleeve by welding, and for manual flection of the guide bar to facilitate said vertical adjustment of the height of the shelf means.

16. A device for the support of an article during transport or storage on a surface at an adjustable height above the surface comprising a plurality of shelf support means, a substantially horizontal shelf means slidable vertically on said shelf support means for support of the article, handle means for manually sliding said shelf means vertically on said shelf support means, the shelf means including clamp means for adjustment of the height of the article in storage thereof, the shelf means further including shelf wheel means for engaging the surface for transport of the article when the shelf means is clamped by said clamp means to a lowermost position on said shelf support means, said shelf support means comprising two pair of vertically elongated members extending above the shelf means when the shelf means is in the lowermost position, each of the first pair of which includes member wheel means contacting said surface, said shelf support means supporting said shelf means and said article on said surface when said shelf means is in a raised position whereby said shelf wheel means are out of engagement with the surface and when said shelf means is in the lowermost position on said shelf support means whereby said device can be moved relative to said surface by movement of said member wheel means and said shelf wheel means.

* * * * *